(12) United States Patent
Mariani et al.

(10) Patent No.: US 7,472,051 B2
(45) Date of Patent: Dec. 30, 2008

(54) DEPENDABLE MICROCONTROLLER, METHOD FOR DESIGNING A DEPENDABLE MICROCONTROLLER AND COMPUTER PROGRAM PRODUCT THEREFOR

(75) Inventors: Riccardo Mariani, Pisa (IT); Silvano Motto, Viareggio (IT); Monia Chiavacci, Prataccio (IT)

(73) Assignee: Yogitech Spa, Viareggio (IT)

( * ) Notice: Subject to any disclaimer, the term of this patent is extended or adjusted under 35 U.S.C. 154(b) by 599 days.

(21) Appl. No.: 10/888,355

(22) Filed: Jul. 9, 2004

(65) Prior Publication Data

US 2005/0050387 A1 Mar. 3, 2005

(30) Foreign Application Priority Data

Jul. 11, 2003 (EP) .................... 03015860

(51) Int. Cl.
*G06F 17/50* (2006.01)
(52) U.S. Cl. .............. 703/13; 714/25; 714/16; 714/6; 714/2; 714/22; 716/18; 716/1; 712/228; 712/1; 712/248; 712/244; 712/11; 708/513
(58) Field of Classification Search ............ 703/13, 703/14; 714/1, 25, 24, 16, 6; 342/355; 345/581; 713/100; 712/41; 716/4
See application file for complete search history.

(56) References Cited

U.S. PATENT DOCUMENTS

| | | | | |
|---|---|---|---|---|
| 5,371,742 A | * | 12/1994 | Brown et al. .............. | 714/2 |
| 5,557,737 A | * | 9/1996 | Wilhite et al. ............ | 714/6 |
| 5,574,927 A | * | 11/1996 | Scantlin .................. | 712/41 |
| 5,963,167 A | * | 10/1999 | Lichten et al. ........ | 342/357.06 |
| 6,081,864 A | | 6/2000 | Lowe et al. ............. | 710/129 |
| 6,105,148 A | * | 8/2000 | Chung et al. ............ | 714/16 |
| 6,170,078 B1 | * | 1/2001 | Erle et al. ................ | 716/4 |
| 6,233,702 B1 | * | 5/2001 | Horst et al. .............. | 714/48 |
| 6,249,893 B1 | | 6/2001 | Rajsuman et al. ........ | 714/741 |

(Continued)

OTHER PUBLICATIONS

Hocenski et al., "Influence of Software of Fault-Tolerant Microprocessor Control System Dependability," 1999 IEEE.*

(Continued)

*Primary Examiner*—Kamini S Shah
*Assistant Examiner*—Cuong V Luu
(74) *Attorney, Agent, or Firm*—Seed IP Law Group PLLC (57) ABSTRACT

A microcontroller comprising a central processing unit and a further fault processing unit suitable for performing validation of operations of said central processing unit. The further fault processing unit is external and different with respect to said central processing unit and said further fault processing unit comprises at least a module for performing validation of operations of said central processing unit and one or more modules suitable for performing validation of operations of other functional parts of said microcontroller. Validation of operations of said central processing unit is performed by using one or more of the following fault tolerance techniques: data shadowing; code&flow signature; data processing legality check; addressing legality check; ALU concurrent integrity checking; concurrent mode/interrupt check. The proposed microcontroller is particularly suitable for application in System On Chip (SoC) and was developed by paying specific attention to the possible use in automotive System On Chip. The invention also includes a method for designing and verify such fault-robust system on chip, and a fault-injection technique based on e-language.

30 Claims, 6 Drawing Sheets

U.S. PATENT DOCUMENTS

| | | | |
|---|---|---|---|
| 6,295,021 B1 * | 9/2001 | Lichten et al. | 342/355 |
| 6,421,790 B1 | 7/2002 | Fruehling et al. | 714/30 |
| 6,499,123 B1 * | 12/2002 | McFarland et al. | 714/724 |
| 6,691,250 B1 * | 2/2004 | Chandiramani et al. | 714/25 |
| 6,819,327 B2 * | 11/2004 | Wasserman et al. | 345/581 |
| 2002/0077782 A1 * | 6/2002 | Fruehling et al. | 702/185 |
| 2003/0046666 A1 | 3/2003 | Siebert et al. | 717/127 |
| 2003/0217256 A1 * | 11/2003 | Gilstrap et al. | 713/100 |
| 2004/0153672 A1 * | 8/2004 | Watt et al. | 713/201 |
| 2005/0028047 A1 * | 2/2005 | Kong et al. | 714/52 |
| 2005/0102567 A1 * | 5/2005 | McGuire et al. | 714/25 |

OTHER PUBLICATIONS

Madeira et al., "Towards a Framework for Dependability Benchmarking," EDCC4 2002.*

IBM Corp., "Selective Software Update," *IBM Technical Disclosure Bulletin 32*(9B):86, Feb. 1, 1990.

IBM Corp., "Selective Software Update," *IBM Technical Disclosure Bulletin 32*(9B), Feb. 1990.

* cited by examiner

DEPENDABLE MICROCONTROLLER, METHOD FOR DESIGNING A DEPENDABLE MICROCONTROLLER AND COMPUTER PROGRAM PRODUCT THEREFOR

BACKGROUND OF THE INVENTION

1. Field of the Invention

The present invention relates to techniques for achieving dependability in microcontrollers units (microcontroller) and was developed by paying specific attention to the possible use in automotive systems.

Exemplary of use of such microcontrollers are systems for anti blocking systems (ABS), torque control system (TCS) and automatic stability control (TSC). However, this is not to be construed in a limiting sense of the scope of the invention that is in fact applicable to a wide variety of applications, comprising x-by-wire, infotainment, biomedical applications, communications, and so on.

The term 'microcontroller' in the following description should be intended in a broad sense, i.e., a System On a Chip (SOC) comprising analog to digital and digital to analog converters, CPU and CPU peripherals, memories, system buses, internal or external sensors and/or transducers, controls, instrumentations, output devices.

The present invention also relates to techniques and corresponding computer program products for the design of dependable microcontrollers.

2. Description of the Related Art

In recent times, the implementation on vehicles of microelectronic systems in order to increase efficiency, safety, performance and comfort as well as information and entertainment has considerably grown.

Such microelectronic systems are based on central processing units and interconnected using robust networks, provided with means for the detection of faults. Such robust networks remove the need for thousands of costly and unreliable wires and connectors, used to make up a wiring loom.

Of course such systems must be highly reliable, as failure will cause fatal accidents. However, the car is a hostile environment having a wide range of temperatures and subject to dirt, salt spray, dust, corrosive fluids, heavy vibration and sudden shock, electrical noise, electromagnetic interference. Further it is needed that such microelectronic systems show near zero power consumption when the car is parked in order not to consume battery charge.

These requirements must combine with requirements for near perfect system modeling and verification such that system behavior is predictable and fail-safe under the most extreme conditions.

As a consequence the use of complex System-On-Chip in the automotive field has been limited, as compared to consumer and communications applications.

It is thus apparent the importance of having a design platform capable to help the system designer to design more complex ECU (Embedded Computational Unit) in less time and with the highest reliability. In general, the most important requirements for a design platform are the abilities to:
  allow hardware and software standardization;
  be adaptable at the customer's needs;
  generate clean codes & scripts in a well defined flow;
  be easily linkable with the operating system;
  allow easy verification of sub-blocks and custom blocks;
  be upgradeable.

In particular, for automotive applications, it is also important:
  scalability in a fast and easy way;
  to give verification detail and allow customizability of the verification;
  to be fault-robust and allow fault-injection in early stage (both for design and verification);

In order to allow a better understanding of the description that follows some definitions pertaining fault-robustness are here supplied.

In general it is called a 'failure' the event that occurs when the delivered service of a system deviates from the specified service. It is called 'error' the part of the system state which is liable to lead to failure. The phenomenological cause of the error is called the 'fault'. 'System dependability' is defined as the quality of the delivered service such that reliance can justifiably be placed on this service.

Dependability is evaluated on the basis of the measure of the three following quantities:
  Reliability: the probability, quantified in MTTF (Mean Time To Failure) that a piece of equipment or component will perform its intended function satisfactorily for a prescribed time and under specified environmental conditions;
  Availability: the probability, quantified by MTTR/MTTF (Mean Time To Repair) that the system will be functioning correctly at any given time;
  Safety: the freedom from undesired and unplanned event that results (at least) in a specific level or loss (i.e., accidents).

To achieve a dependable system, the following methods can be used, separately or together:
  fault-avoidance, that provides for avoiding faults by design;
  fault-removal, that provides for reducing the presence of faults, by verification. In this method fault-injection techniques are fundamental;
  fault-tolerance, a technique that provides correct operation despite presence of faults;
  fault-forecasting or fault-evasion, that provides for estimating, by evaluation, the presence, the creation and the consequences of faults and taking pre-emptive steps to stop the fault from occurring.

From the previous definitions, it is worth noting that fault-tolerance by itself does not solve the dependability needs of a complex system. For instance, a fault-tolerant system could not be fail-safe. Thus, in the following, reference will be made to the concept of robustness, defined as the ability of a system to continue to function despite the existence of faults in its component subsystems or parts, even if system performance may be diminished or otherwise altered—but always in a safe way—until the faults are corrected. A fault-robust system will keep its function even with changes in internal structure or external-environment.

The solutions known from the prior art provide for hardening the fabrication technology, so that is less prone to radiation-induced soft errors, or for introducing redundancy: at gate level, for example by implementing triple flip-flop structures with majority voting (N-modular redundancy); or at CPU level, for example by introducing some coding in the logic units of the processor; or at microcontroller level, for example by using multiple processors running in step with watchdogs; or at software level, for example by using multiple software threads, or a mixture of all of the above techniques.

Technology hardening and redundancy at gate level are very expensive in terms of area and performance overhead, CPU redesign time and so on.

Redundancy at CPU level is less expensive in terms of area overhead, but it requires CPU redesigning.

Redundancy at microcontroller level is the most used technique, either using N-modular redundancy (N=2 is the most used, i.e., dual redundancy) or with dynamic redundancy. From the U.S. patent application No. 2002/00777882 a dual-redundant microcontroller unit is known, comprising a first central processing unit and a secondary processing unit coupled to the first processing unit. A functional comparison module is coupled to the primary processing unit and to the secondary processing unit for comparing a primary output of the primary processing unit and a secondary output of the secondary processing unit to detect a fault if the primary output does not match the secondary output. Functional comparison is performed by analyzing signatures of the outputs. Signatures are computed in idle cycles or are obtained as results of test sequences or are determined on the basis of external address and data buses of the CPU itself, so that only a limited visibility of the content of the CPU is available. This very often results in inefficient signatures from the point of view of fault coverage and memory occupation, and in a greater latency of error detection.

Dual redundant techniques, as depicted also in German patent application DE 19933086A1, of course imply a great increase in circuits size (at least the double) and an even greater increase in production costs. Moreover, performances are affected because of need for slower clocks, increased gate count and inclusion of redundant software.

Dynamic redundancy techniques are also known that require only the processor plus a fault detector that can identify faulty behavior of the processor. Such techniques allows for a higher utilization of computing resources, but they could generate a greater latency, because of the greater number of computations required to achieve good fault coverage. The most common solutions in this case consist in watchdogs or very simple fault detectors monitoring the data and address bus only to compute simple consistency checks. In other known solutions, the CPU itself is charged to handle part of the dependability issues, interacting with a simple external controller: in U.S. Pat. No. 5,436,837, a microcomputer and a monitoring module are disclosed. The monitoring module is preferably configured as a gate-array which executes a sequence control of the microcomputer. The monitoring module determines the correct or defective operation of the microcomputer from a comparison of the results of this processing.

Also solutions are known, for example from U.S. Pat. No. 5,880,568, that introduce redundancy at software level only. Such solutions however affect strongly the microprocessor performance because of the fault-detection tasks.

BRIEF SUMMARY OF THE INVENTION

One of the goals of the present invention is thus to provide a microcontroller that achieves high dependability, while making proper use of computing resources and circuit size.

According to the present invention, this object is achieved by means of a dependable microcontroller having the characteristics set forth in the claims that follow. The invention also relates to a corresponding method for designing a dependable microcontroller, as well as to a computer program product directly loadable in the memory of a digital computer and comprising software code portions for performing the methods of the invention when the product is run on a computer.

Substantially, the solution according to the invention provides a microcontroller that contains a fault tolerant processing unit for validating operation of the central processing unit. The fault tolerant processing unit implements also a distributed fault tolerant detection method on the chip through suitable interfaces and fault tolerant hardware blocks. A method for designing the system comprising the fault tolerant processing unit, interfaces and hardware blocks is also provided.

In comparison with prior art arrangements, the proposed solution reduces the area overhead required on the chip, allows low latency control of the fault in the central processing unit and it is fully and flexibly customizable according to the System On Chip and user needs.

BRIEF DESCRIPTION OF THE DRAWINGS

The present invention will now be described, purely by way of non-limiting example, with reference to the annexed drawings, wherein.

DETAILED DESCRIPTION OF THE INVENTION

The basic idea underlying the microcontroller described herein is that, in order to have a fault-robust systems, hardware redundancy is implemented, controlled and configured by software in order to achieve fault tolerance of complex CPU-based system on a chip without compromising execution time and code dimensions and with an acceptable hardware overhead.

The microcontroller according to the invention implements distributed fault-tolerant techniques in every part of the system to be monitored, through suitable circuitry that is demanded to watching a particular problem and communicating with a central fault-tolerant processor, that is external and different from the central processing unit, i.e., it is not a dual central processing unit and it has autonomous computing resources external to that of said central processing unit. Such a central fault-tolerant processor coordinates all the peripherals and keeps track of the fault-history of the system.

Figure 1:
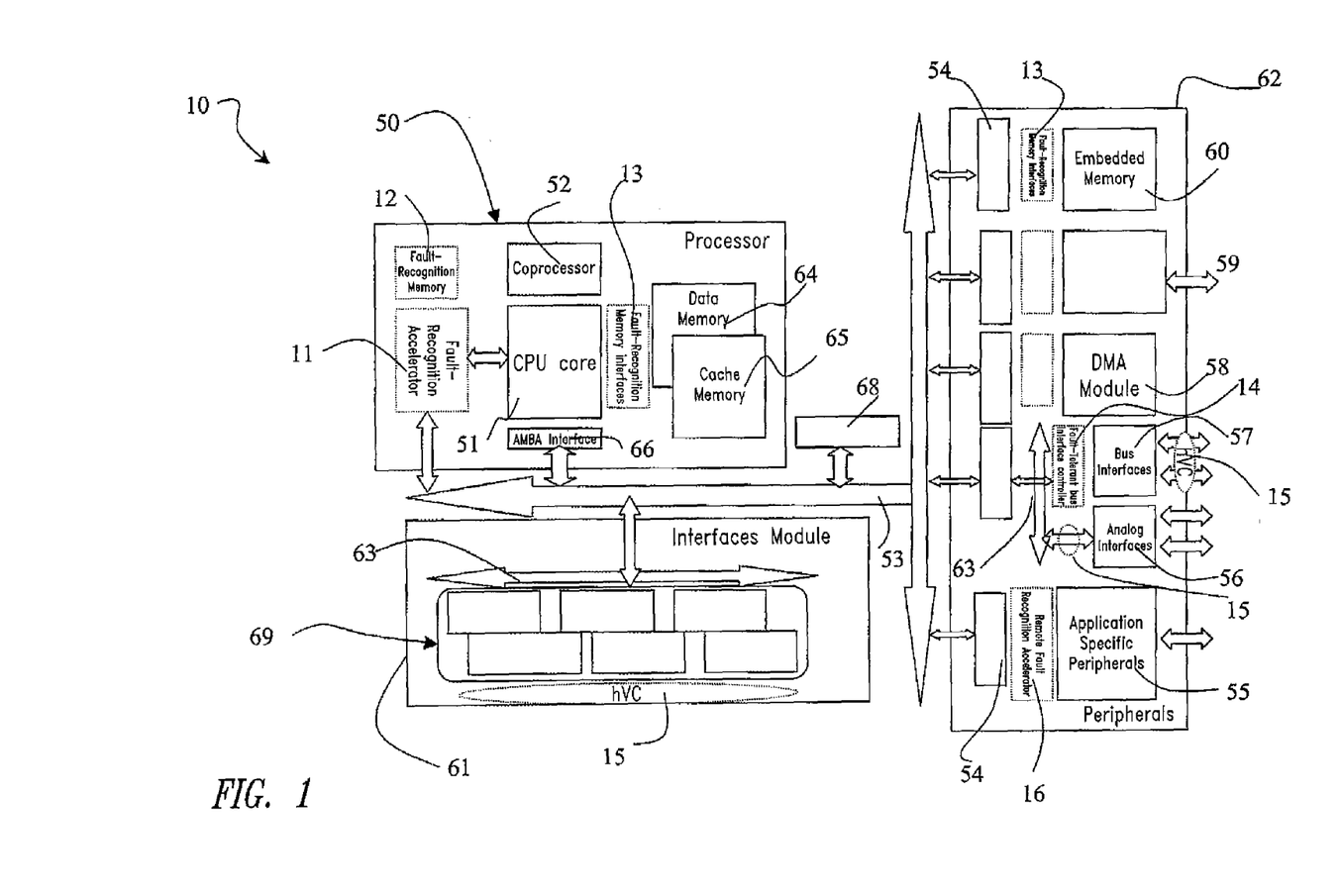
FIG. 1 shows a block diagram of the microcontroller of the invention.

In FIG. 1 a block diagram is shown representing the hardware architecture of a microcontroller 10.

Such a microcontroller 10 basically comprises a processor 50, that can be for instance a RISC unit like an ARM processor, comprising a central processing unit core 51, associated to a coprocessor 52. The processor 50 comprises also a data memory module 64, instruction cache memories 65 and a AMBA (Advanced Microcontroller Bus Architecture bus interface) interface 66. A CPU system bus 53 is provided for connecting the processor 50 with an interfaces module 61, comprising among others a general purpose input/output interface, a serial parallel interface, a real time clock, a UART, timers and watchdogs. These interfaces are indicated collectively with reference 69.

Also a vector interrupt controller 68 is shown, connected to the CPU system bus 53.

Such a CPU bus system 53 also allows communication with a set of peripherals 62. Such a set of peripherals 62, comprises application specific peripherals 55, analog interfaces 56, bus interfaces 57, a direct memory access (DMA) module 58, an external bus interface 59, an embedded memory 60. The interfaces module 61 and the set of peripherals 62 also include suitable peripheral buses 63, interconnecting their different devices.

All the components mentioned above are typical of a microcontroller architecture, and they will be not described in further detail, as their functions and use are well known to a man skilled in the art of microcontroller designing.

According to the invention, the microcontroller 10 further comprises a Fault-Recognition Accelerator 11, that is a processor operating as the main fault-manager. In the following, for conciseness' sake, the Fault-Recognition Accelerator 11 will be sometimes also referenced by its acronym, FRAC. Such a Fault-Recognition Accelerator 11 is composed by a plurality of user-configurable modules for implementing different fault-detection and fault-tolerance techniques. Fault-recognition Accelerator 11 and related modules and peripherals are indicated in dashed line in FIG. 1 for easier identification.

The Fault-Recognition Accelerator 11 is placed, in the processor 50, in communication with the central processing unit core 51. The Fault-Recognition Accelerator 11 operates in association with a Fault Recognition Memory 12, also placed in the processor 50, that can be a dedicated memory or a part of the CPU memory with dedicated ports. The Fault Recognition Memory 12 stores data, such as code, historical tracks and other data needed by the Fault-Recognition Accelerator 11 to implement its functions.

As better detailed in a following part of the description, the Fault Recognition Accelerator 11 comprises different modules, and it is dedicated to survey the overall system and the other fault-tolerant peripherals through the system bus 53 and other dedicated signals. The Fault-Recognition Accelerator 11 is also responsible for start-up and periodic system built-in tests. Fault Recognition Accelerator 11 can be accessed both through the processor core 51, a JTAG port of the system and also directly through bus interfaces, in order to allow fast diagnostic and maintainability at system level.

In order to attain full dependability the Fault Recognition Accelerator 11 is able to generate fault alarms and events, like an exception, a program retry or a system stop, due to a fault in the central processing unit 51 or a fault in the Fault Recognition Accelerator 11 itself. The Fault Recognition Accelerator 11 must be always able to react to these problems and avoid unsafe system conditions.

Fault-Tolerant Memory interfaces 13 are also provided on the microcontroller 10, for interfacing with memories such as data memory 64, cache memories 65 comprised in the processor 50, the embedded memory 60 and the DMA module 58 comprised in the set of peripherals 62. Faul-Tolerant Memory interfaces 13 are composed by various user-configurable modules implementing different memory fault-detection and fault-tolerance techniques like Error Correction Code (ECC), Built-In Self Repair (BISR), and so on.

For the protection of bus such the peripheral bus 63 or of the CPU system bus 53 or other-external buses such CAN bus, a Fault-Tolerant bus interface controller 14 is provided.

As it can be observed in FIG. 1, hardware Verification Components 15 (hVC) are also provided, in association with different modules and devices of the microcontroller 10. In the embodiment shown a hardware Verification Component 15 is thus associated to the interfaces module 61, to the analog interfaces 56 and to bus interface 57. The hardware Verification Components 15 comprise various user-configurable modules implementing fault-detection and fault-tolerance techniques directly derived from the system-level verification requirements of a verification platform and a corresponding design and verification procedure, that will be detailed in the following with reference to FIGS. 4 and 5.

The microcontroller 10 also comprises a Remote Fault Recognition Accelerator 16, associated to the Application Specific Peripherals 55, that is a special processor for application specific safety requirements.

Figure 2:
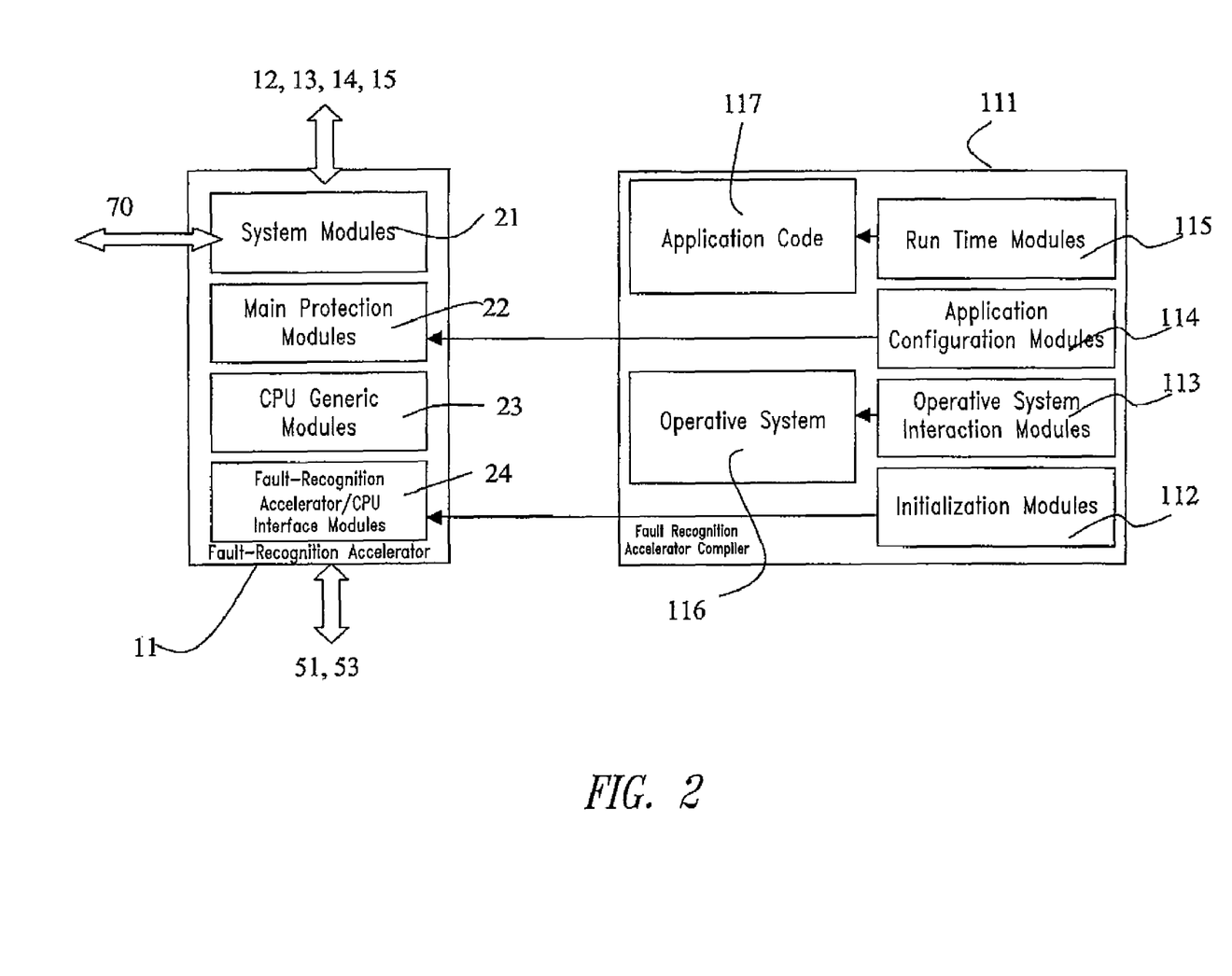
FIG. 2 shows a block diagram of a detail of the microcontroller of FIG. 1.

The hardware architecture of Fault Recognition Accelerator 11 is represented in FIG. 2. The Fault Recognition Accelerator 11 is associated to a Fault-Recognition Compiler 111, that is a software process for creating initialization/configuration boot routines for the Fault Recognition Accelerator 11 and for extracting runtime settings to be inserted in the user code in order to facilitate the interaction between the CPU core 51 and the Fault Recognition Accelerator 11 itself. Moreover, if area overhead is an issue or if the CPU core 51 is not able to interface with Fault Recognition Accelerator 11 in a proper way, Fault Recognition Compiler 111 can also insert in the user code various software modules, similar to modules of Fault Recognition Accelerator 11 for providing the same fault-detection and fault-tolerance functionalities.

The Fault Recognition Accelerator 11 associated to the Fault-Recognition Compiler exploits a mixed "data and circuit-oriented" instead than a pure "circuit-oriented" fault protection mechanism, i.e., the protection is firstly applied to part of the system and part of the data that are relevant for the application. This relevant part is identified both by the user itself in the process of designing the System on Chip, as it will be detailed with reference to FIG. 6, and by the Fault Recognition Compiler 111 through some techniques of code analysis as it will be detailed with reference to FIG. 7.

Therefore, the fault protection is obtained with a combination of techniques implemented both in hardware, in the Fault Recognition Accelerator 11, and in software, in the Fault Recognition Compiler 111.

In FIG. 2 such modules for Fault Recognition Accelerator 11 and Fault Recognition Compiler 111 are shown.

The Fault Recognition Accelerator 11 thus comprises:

System Modules 21, which are modules needed to interact with the Fault recognition peripherals such as Fault recognition Memory 12, Bus Interface Controller 14, Fault-Tolerant Memory interfaces 13, hardware verification components 15, and to interact with basic system components such as clock and power supplies, indicated collectively with reference 70. Moreover, system modules 21 include basic modules needed to manage all the other internal modules of the Fault Recognition Accelerator 11 and the program watchdog. System modules 21 can be regarded as CPU independent for what concerns design; however they depend on the overall system architecture;

Main Protection Modules 22, which are modules needed to implement the main fault protection techniques, such as Variable Legal/Delta values, Code&Flow Signature, and so on. These modules can be regarded as CPU independent;

CPU Generic Modules 23, which are modules needed to process data arriving from Fault Recognition Accelerator/CPU interface modules 24 and to exchange data with the main protection modules. CPU Generic Modules 23 are slightly CPU dependent, i.e., basic algorithms are CPU independent, however the way the data are processed can change with the CPU family.

Fault Recognition Accelerator/CPU interface modules 24, which are modules needed to exchange data with the CPU core 51 and the CPU system bus 53. Modules 24 are CPU dependent.

In FIG. 2 is also shown the Fault Recognition Accelerator compiler 111, comprising different software modules, organized as in the following:

Initialization Modules 112, which are modules needed to initialize all the basic functions of the Fault Recognition Accelerator 11 and initialize its peripherals, independently by an Operative System 116 or by a User Application Code 117;

Operative System Interaction Modules 116, which are modules needed to interact with the operative system;

Application Configuration Modules 114, which are modules needed to configure the Fault Recognition Accelerator 11, e.g., the runtime signatures, based on the Operative System 116 and on the User Application Code 117;

Run Time Modules 115, which are modules needed to insert into the Application Code 117 the needed instruction to allow fault-detection and protection techniques. As it will be better detailed in a following part of the description, most of the run time modules 115 are the counter-part of hardware modules comprised in the Fault Recognition Accelerator 11, i.e., they are needed only if the correspondent function is not carried out in the correspondent hardware module, for instance because of area overhead constraints or interface capabilities of the Fault Recognition Accelerator/CPU interface modules 24.

The Fault Recognition Accelerator 11, in order to detect faults in the CPU core 51, executes three main different kinds of tasks in different times during the microcontroller activity, in cooperation with other FRAC peripherals:

microcontroller fault-forecasting at power-on: a sequence of BIST tests, or BISTs, run by the Fault Recognition Accelerator 11 after power-on. Such BISTs are self-consistent software run in the Fault Recognition Accelerator 11 or in a piece of dedicated hardware therein and they are focused either to cover the highest percentage of the functionality under test or to cover only the core functionalities needed by the real application. A BIST sequence performed by the Fault Recognition Accelerator 11, substantially comprises a Built In Self Test on the RAM of the Fault Recognition Accelerator 11, that is performed after power-on through its embedded Fault-tolerant Memory Interfaces 13. Then a Built In Self Test on the Fault Recognition Accelerator 11 is performed. Subsequently, validation passes on the CPU core 51 and a CPU RAM Built In Self Test is performed through Fault-tolerant Memory Interfaces 13. Then in a Built In Self Test on the CPU core 51 is performed. Subsequently, fault-tolerant peripherals are validated through dedicated hardware Verification Components 15. Then a BIST operation is performed on the bus interfaces through dedicated fault-tolerant bus interface 14. Finally external BIST operations are launched, to reach a 'System Ok' condition, if all above steps are successfully passed;

microcontroller on-line fault-forecasting: it is a subset of previously described BISTs executed during the system runtime. The microcontroller on-line self-test is run in two ways:

during idle times, by isolating the block to be tested (e.g., the CPU or the RAM or one of the peripherals) by the rest of the system saving the current state, then by running the correspondent BIST and finally restoring the initial state;

during normal operation, the Fault Recognition Compiler can be allowed to insert (for instance during loops), extra dummy codes in order to do in parallel active-tests in part of the CPU currently not used.

on-line fault tolerance: it is a set of techniques for detecting faults during normal operation and taking actions when a fault is found, including data shadowing, code and flow signature, data processing legality check, addressing legality check, ALU concurrent integrity checking and concurrent mode/interrupt check.

In the following the techniques for implementing on-line fault tolerance will be detailed.

A data shadowing procedure is implemented, that is relevant for the operation of the proposed microcontroller, as it is applied both to variables wherever they are located in the microcontroller, and to CPU registers.

RISC processors, such ARM processor, are strongly based on register operations, i.e., each data transfer is carried out through one of the internal registers of the CPU. To address such faults of processor 50, a set of registers of the Fault Recognition Accelerator 11 is used as shadow copy of the processor 50 registers, and an extended visibility of these registers is obtained either using, if the extended core visibility needed to implement the first one is not available, a hardware FRAC module called Fault Recognition Accelerator-Core interface or a Fault Recognition Accelerator-Core software Interface, that will be detailed in describing modules 21 to 24.

In particular, through such Fault Recognition Accelerator-Core interface, each time the Fault Recognition Accelerator 11 detects a write operation on one of the processor registers, it copies the written value in the corresponding shadow register. This is also done for Fault Forecasting: periodically, the CPU data will be compared with its shadow copy stored into the Fault Recognition Accelerator 11.

Concerning faults in memories and data/instruction caches where no ECC/BISR is used, the Fault Recognition Accelerator Compiler 111 analyses the source code and compute for each variable a reliability weight, which will take into account the variable lifetime and its functional dependencies with other variables. The evaluation performed in this phase identifies a list of the most reliability-critical variables. Then, Fault Recognition Accelerator 11 will be configured to manage the most critical variables and it will follow and shadow them during their life in the microcontroller. Of course the user can also select which variables to protect.

An other important technique implemented in the proposed microcontroller is the program and flow signature on-line monitoring. For implementing robustness against code-faults the Fault Recognition Accelerator 11 generates run-time signatures of the code running on the CPU core 51 without overloading the processor and it checks the calculated signatures comparing them with the compile-time generated one. Through the Fault Recognition Accelerator Compiler 111, the Fault Recognition Accelerator 11 can be configured to handle either control flow and/or data processing signatures. For Control flow signatures during the compile process, the target assembly code is split in branch-free blocks. A branch-free block is a set of consecutive instructions not containing jump. At this point, the Fault Recognition Accelerator Compiler 111 computes a signature composed by different sections:

a block signature, i.e., a signature of all the op-codes contained in each branch-free block. This signature is computed by the compiler by coding the operating codes of the instructions contained in the block by using self-consistent non-overlapping codes;

a control-flow regular expression. During compile time, a Control Flow Graph is computed and therefore information about allowed path respect previous block are included in each signature.

At execution time, the Fault Recognition Accelerator 11 will monitor the code execution flow. In particular, it will real-time compute and check the branch-free block signatures and it will real-time compare the executed program flow with the reference, either stored in the Fault Recognition Memory 12 or embedded in the user code by the compiler 111. This approach will allow covering code faults, regardless their hardware location (memory or CPU). In case of error, the Fault Recognition Accelerator 11 will try (if possible) to repair the fault, restarting the execution flow from the last fault-free block (retry). Therefore, from the point of view of Fault Recognition Accelerator 11, at the beginning of each block, the Fault Recognition Accelerator will recognize the starting signature and it will store this signature in an internal register for the run-time computing. At the end of the block the Fault Recognition Accelerator 11 will recognize either the branch instruction or the beginning of a new block (through its signature). In both cases, the run-time generated signature is compared with the expected result. When a branch occurs, the Fault Recognition Accelerator will recognize the next operation as one of the allowed signatures associated with the corresponding block. Therefore, in case of error, different actions can be taken: notify the error to the operating system, restart the program, jump to a previous check-point block.

The Fault Recognition Accelerator 11 in the proposed microcontroller also implements a data processing legality check procedure. Previous code and flow signature mechanism allow the coverage of code faults: it catches misinterpreted data, erroneous calculations, transient or permanent faults that cause any differences of the code execution flow with a very high coverage due to the use of the operation code as signature seed. However, this error detection mechanism can be further enhanced by adding protection on critical variables of the application running on the processor. With the same reliability-weight techniques used by Fault Recognition Accelerator Compiler 111 to individuate memory variables to be shadowed, the most important variables of the application code (plus the one selected by the user) can be selected and coupled With either:

Legal Absolute values (i.e., maximum and minimum allowed values) that are checked by Fault Recognition Accelerator 11 during runtime execution;

Legal Delta values, evaluated with respect to the previous operation on the same variable. In such a way, the result of each single operation carried out by ALU or MAC can be run-time checked against the set of allowed values, and in the case of an error, the operation can be repeated or the execution stopped;

Legal Context values, i.e., timeframe and processes/tasks in which these variables can be read/written.

The same data processing legality check is performed by the hardware verification components 15 for variables living outside the CPU core and for signals exchanged with the external world.

An other important implemented procedure is the address legality check. During each data transfer, Fault Recognition Accelerator 11 checks legal values for a given address (Legal absolute, delta and context value) based on register to memory visible data transfers. When a mismatch is detected, an exception is generated. This is also performed in multi-process applications: based again on register to memory visible data transfers, Fault Recognition Accelerator 11 is able to performs checks on the memory accesses made by the various tasks, especially when virtual addressing is not used. More in detail, in case a task performs an access to non-shared or other tasks regions, an exception is generated.

An ALU concurrent integrity checking procedure is also proposed. The other crucial block in a RISC CPU is the integer core, in particular the Arithmetic Logic Unit (ALU), that often includes a Multiply-and-Accumulate (MAC) unit. Fault Recognition Accelerator 11 includes a reduced version of the ALU/MAC working with a coded copy of the shadowed registers (i.e., with a lesser number of bits), in order to concurrently check the results of the CPU core ALU/MAC without having a full copy of the ALU/MAC itself. In order to do that, extended visibility of the ALU/MAC core path is obtained either using the hardware FRAC module called Fault Recognition Accelerator-Core interface (detailed afterwards) or the Fault Recognition Accelerator-Core Software Interface (detailed afterwards) if the extended core visibility needed to implement the first one is not available.

In the proposed microcontroller, coding is implemented in such a way to maintain either basic mathematical operators such as sum, subtraction and multiplication, but also rotation, shift and similar logic operations as performed in a modern RISC processor.

A concurrent mode/interrupt check procedure is also implemented. During normal operation the Fault Recognition Accelerator 11 verifies flags and CPU mode signals, and on the basis of shadow Registers contents decides if the proper mode is set or not. When a mismatch is detected, an exception is generated. The same check is performed with interrupts, i.e., if interrupts were generated when not allowed or the opposite.

Figures 3, 4:
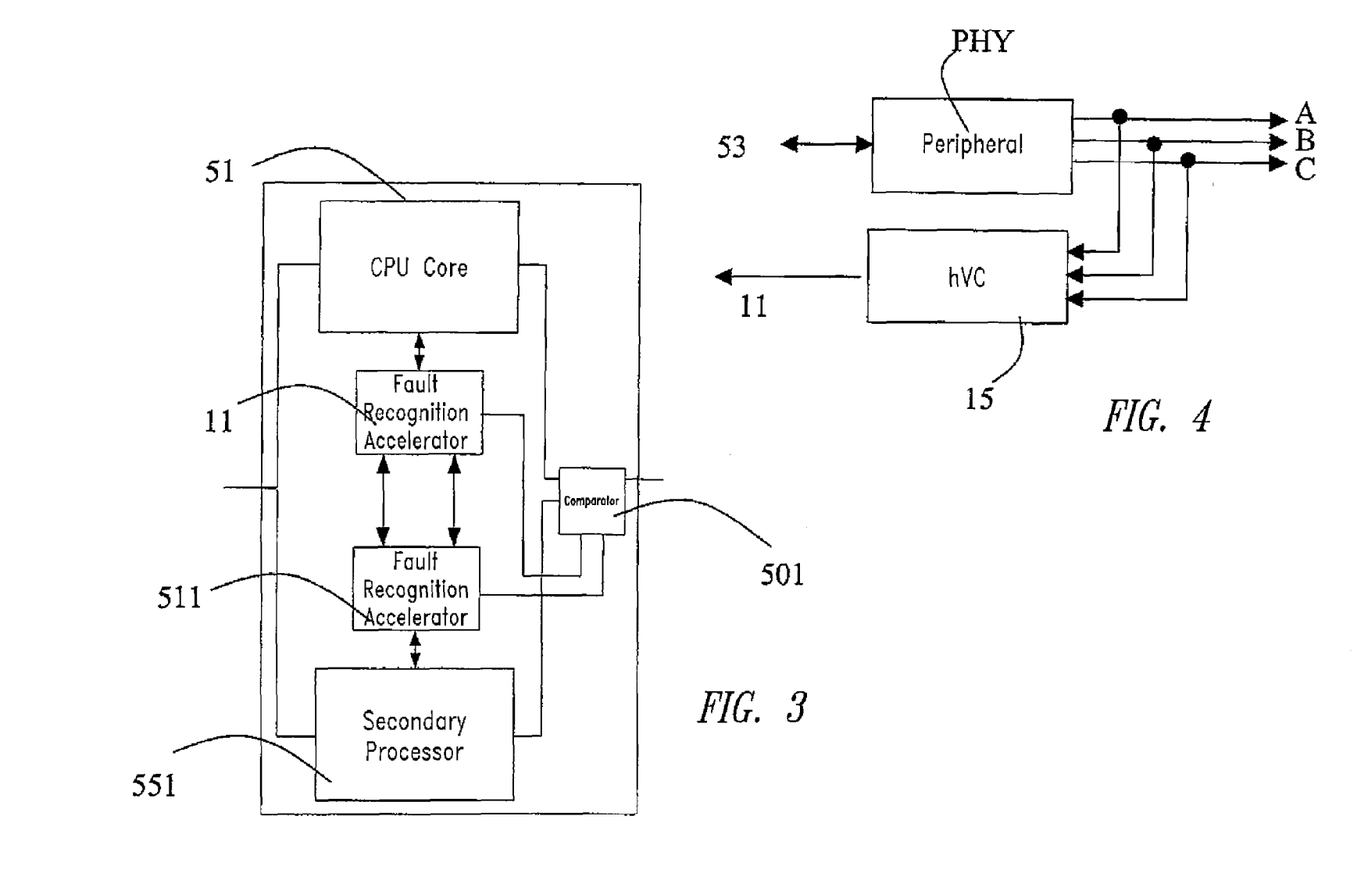
FIG. 3 shows a block diagram representing a further embodiment of the microcontroller of the invention.
FIG. 4 shows a further detail of the microcontroller of FIG. 1, related to an hardware verification component.

It is worth noting that the same circuit architecture based on the Fault Recognition Accelerator 11 and related Fault Recognition Compiler 111 can be also applied in same way to standard solutions, as for instance dual-redundant architecture as represented in FIG. 3. In such an architecture a central processor 51 operating in association with the Fault Recognition Accelerator 11 is coupled with a secondary processor 551, operating in association with a second respective Fault Recognition Accelerator 511. The two Fault Recognition Accelerators 11 and 511 are interacting using one of the Fault Recognition Accelerator modules 21 described afterwards. A comparator 501 is also included to select which of the processing units is currently selected based on decisions taken by the two Fault Recognition Accelerators 11 and 511.

In the following, the modules that can be part of the Fault Recognition Accelerator 11 are detailed.

System modules 21 comprise:

a Global Supervisor Module that is the main controller and scheduler, for all the Fault Recognition Accelerator 11 activities, for instance the scheduling of BISTs sequence of FIG. 3. It also contains all the Fault Recognition Accelerator status and configuration information, to be shared with the Operative System and User Application code through the CPU system bus 53;

a Program Watchdog Module that is composed by a watchdog triggered both by events inserted by the user into the software application and by time-windowed events automatically inserted by the Fault Recognition Accelerator Compiler 111 itself. For the events inserted by the Fault Recognition Accelerator Compiler 111, the timeout event is computed taking into account expected timings limits (upper and lower). A timeout event generates an exception of this module for the Global Supervisor Module and to a Safe State Module, described in the following;

Fault Recognition Accelerator-Peripheral Manager Module, that is a module that manages all the interfaces of the peripherals of the Fault Recognition Accelerator 11, e.g., the interfaces of hardware Verification Components 15. When an error is detected in the CPU core 51, peripherals can be placed in a safe state configured at compile-time, or when an error is detected in the peripherals, the Global Supervisor Module and the Safe State Module are informed;

FRAC to FRAC Module that is a module needed when additional system fault-detection is a requirement or if multi-Fault Recognition Accelerator architectures are performed. Such a module comprises substantially a block that interfaces the internal Fault Recognition Accelerator 11 with an external Fault Recognition Adcelerator (for hierarchical fault-robust systems or dual redundant systems as in FIG. 3) or with an external watchdog to have an additional protection in case of Fault Recognition Accelerator faults;

Debug-If Manager Module that manages all the data transfer from Fault Recognition Accelerator 11 to the external world for debug purposes, through a JTAG or ISO9141 interface.

Fault Recognition Accelerator-Memory Manager Module that manages all the interactions memory between the Fault Recognition Accelerator 11 and the Fault recognition Memory 12.

Clock Supervisor Module, that is a module comprising a clock guardian fed by an independent clock source. By way of example, this module can be implemented by counting the number of system clocks contained in a period of a slow clock oscillator, that can be internal or external to the Fault recognition accelerator 11 and the guardian is able to detect the degradation of the main clock during a fixed time window, i.e., if the clock is greater or lower of pre-determined safety levels. A timeout event generates an exception of this module for the Global Supervisor Module, and the slow clock is used to clock the Safe State Module to drive the system toward a fail-safe state;

Power Supervisor Module, that is a module composed by a scheduler that receives both from an external Power Supply Level Detector and from the Global Supervisor Module a signal specifying the need of a safe power-up or power-down. When enabled, it starts the Safe State Module and then provides a safe procedure to switch-on (power-up) or switch-off (power-down) the resets and clocks of the system. During the switch-off this module can also activate an external secondary power unit.

The Main Protection Modules 22 comprise:

Shadow Variable Module that makes a copy of the critical variables used by the application and updates such variables based on register to/from memory visible data transfers (Load/Store instructions). The shadow variable module compares memory to register transfers with the mismatches. When a mismatch is detected, an exception is generated for the Global Supervisor Module, the Safe State Module and the Data Retry Module, either hardware or software. The shadow variable modules can be configured via software to select variables to be protected.

Legal Variable Module, that is a module checking legal values for a given variable (Legal absolute, delta and context value) based on register to/from memory visible data transfers (Load/Store instructions) When a mismatch is detected, an exception is generated for the Global Supervisor Module and the Safe State Module. Legal variable module can be configured by software to select variables to be protected and values for the legal values;

Code&Flow Signature Module, that is a module, based on the code and flow signatures computed in compilation time by the Fault Recognition Accelerator Compiler 111, and stored in the Fault Recognition Memory 12 or embedded in the user code memory, and based on code and flow signatures computed run-time by their module itself using the runtime instruction code. This module is able to detect faults in the CPU program flow. Furthermore, the module is able to detect faults in inline literals when they are loaded in the CPU core 51. When a mismatch is detected, an exception is generated for the Global Supervisor Module, the Safe State Module and the Program Retry Module;

Safe State Module, that, when triggered by a software signal, or by the Global Supervisor Module, or by other modules as described above, is able to start a procedure to bring the system to a safe-state, i.e., by putting safe values in the variables, stopping the CPU 51, sending a signal to the Fault Recognition Accelerator-Peripheral Manager Module to put all the peripherals of Fault Recognition Accelerator 11 in a safe state. It is configured at compile time;

Shadow Register Module, that makes a copy of the register bank of the CPU, and updates it based on memory to register visible data transfers (Load/Store instructions) and based on the access to the ALU Write pbrt available from Fault Recognition Accelerator-Core Interface Module. Then the shadow register module compares final register to memory transfers with the contents of the internal copy, detecting mismatches. When a mismatch is detected between internal results and the one on the ALU write port, an exception is generated for the Global Supervisor Module, the Safe State Module and the Data Retry. This module can be configured by software to select register to be protected;

Legal Load-Store Unit (LSU) Module, that is a module for checking legal values for a delta value, space and time context value) based on register to memory visible data transfers (Load/Store instructions). When a mismatch is detected, an exception is generated for the Global Supervisor Module and the Safe State Module. This module can be configured by software to select addresses to be protected and value for the legal values;

Task Supervisor Module, used in multi-process applications. Based on register to memory visible data transfers (Load/Store instructions), it is able to performs checks on the memory accesses made by the various tasks, especially when virtual addressing is not used. More in detail, in case a task performs an access to non-shared or others generated for the Global Supervisor Module, the Safe State Module and the Program Retry Module;

Data Retry Module, used when, besides fault-detection, also fault-correction is needed. Based on the results of the Shadow Variable or Shadow Register Module or Legal Variable Module, it is able to restore the value of a faulty variables/registers in the memories, by using the CPU ports, or by interacting with the Data Retry software module;

Prog Retry Module, used when besides fault-detection is needed also fault-correction. Based on the results of the Code&Flow Signature Module, it is able to restore the CPU state and program counter, by using the CPU ports or by interacting with the Program Retry Module;

Fault Recognition Accelerator CPU Generic Modules 23 comprise:

Opcode Decode Module that is the generic module that decodes op-codes read from an interface between Fault Recognition Accelerator 11 and the Coprocessor 52 and from Fault Recognition Accelerator ETM (Embedded Trace Module) interface, and provides the decoded control signal to the other modules;

Exc/Int Supervisor Module, that is a module for continuously checking if the issued interrupts and exceptions are valid and served, considering the memory map configuration (access permissions, alignment and unaligned accesses etc.) and the interrupt requests. Furthermore it detects if an exception was supposed to be raised (for instance due to an user access to privileged areas) but it is not. If a fault is detected an exception is generated for the Global Supervisor Module and the Safe State Module;

Mode/Flag Supervisor Module, that verifies flags and CPU mode, based on Shadow Register Module and Fault Recognition Accelerator Software Register Shadowing Module, and based on signals coming from the CPU. When a mismatch is detected, an exception is generated for the Fault Recognition Accelerator Global Supervisor and the Fault Recognition Accelerator Safe State Module;

Boundary Supervisor Module, that continuously compares addresses, data and control signals generated by the Load-Store Unit (LSU) with the CPU memory boundaries, not checked by other modules, in order to detect faults in the units in between. When a mismatch is detected, an exception is generated for the Global Supervisor Module and the Safe State Module;

ALU/MAC Supervisor Module, that makes a reduced copy of the CPU Integer Core, including most critical ALU/MAC operations implemented on coded values (e.g., operating on module-three numbers). It has access to the Shadow Register Module and checks results detected on the ALU write port of the core, obtained through the Fault Recognition Accelerator-Core interface. When a mismatch is detected between internal results and the one on the ALU write port, an exception is generated for the Global Supervisor Module and the Safe State Module. If fault-detection is needed on operations not implemented in this reduced module, they can be decomposed in safe instructions by the Fault Recognition Accelerator Compiler 111;

Coprocessor Supervisor Module, based on the Shadow Register Module, checks if the data transferred from the CPU registers to the coprocessor is valid or not. When a mismatch is detected, an exception is generated for the Global Supervisor Module and the Safe State Module;

BIST Supervisor Module that, when triggered by a software signal, or by the Global Supervisor Module, or by the Power Supervisor module, is able to start a BIST (Built In self Test) of the CPU core 51 or part of it. When a mismatch is detected, an exception is generated for the Global Supervisor Module and the Safe State Module;

Instruction Prediction Module, that is an advanced module carrying out a sort of a cache storing recent part of codes executed by the CPU core 51, comparing with the current program flow and detecting differences. When a mismatch is detected, an exception is generated for the Global Supervisor Module, the Safe State Module, the Program Retry Module (Hardware or Software).

Fault Recognition Accelerator CPU Specific Module 24 comprise:

Fault Recognition Accelerator-INT module, that interfaces Fault Recognition Accelerator 11 with the CPU interrupt lines;

Fault Recognition Accelerator-COPROC interface module interfaces Fault Recognition Accelerator with the CPU Coprocessor 52 interface;

Fault Recognition Accelerator-Embedded Trace Module (ETM) Interface, that interfaces Fault Recognition Accelerator with the CPU core ETM Interface;

Fault Recognition Accelerator-Boundary Interface that interfaces Fault Recognition Accelerator 11 with the CPU buses 53 and 63 and interface signals, such as Instruction Cache Memories, AMBA busses, and so on.

Fault Recognition Accelerator-Core interface, that interfaces Fault Recognition Accelerator with the CPU Integer Core to give extended hardware visibility (such as the visibility of the ALU Write port for the register shadowing, and so on).

For what concerns the Fault recognition Acceleration Compiler 111, the Initialization software Modules 112 contain the code needed to initialize the Fault Recognition Accelerator 11 with respect to the system.

The Operative System Interaction software Modules 113, that are needed to interact with the Operative System, comprise an Operative System Driver Software Module containing the code needed to configure Fault Recognition Accelerator 11 with some Operating System runtime settings, such as the addresses where an image is mapped at runtime, dynamic Process ID. Furthermore, the module comprises some code possibly needed by the operating system to read Fault Recognition Accelerator fault status, as well as other statistic values. This interaction is to release Fault Recognition Accelerator status information to the Operative System.

Application Configuration Software Modules 114, needed to configure the Fault Recognition Accelerator 11 comprise:

Base Configuration Software Module containing the code needed to configure the Fault Recognition Accelerator 11 with respect to the Operative System and the Application User Code;

Signature Configuration Software Module, containing the code needed to configure the Fault Recognition Accelerator with the code&flow signatures computed at compile time by Fault Recognition Accelerator Compiler 111.

Finally Runtime Modules 115, as mentioned previously, are in most part the counter-part of already described hardware modules of the Fault Recognition Accelerator 11 hardware modules, i.e., they are needed only if the correspondent function is not realized in the correspondent hardware module. Runtime modules 115 comprise:

EXC/INT Supervisor Software Module, that is the software counter-part for the hardware Exc/Int Supervisor Module;

CPU Supervisor Software Module, that contains the code needed to verify the processor configuration (block settings, memory mapping etc.). If a fault is detected, the module is able to restore the program flow as the Program Retry Module;

Task Supervisor Software Module, that is the software counter-part for the Task Supervisor Module;

Fault Recognition Accelerator-Core Software Interface is composed by code that mimics at software level what Fault Recognition Accelerator-Core Interface does at hardware level. In particular, when necessary, copies of the internal core registers are made into the Fault Recognition Accelerator 11;

Coprocessor Supervisor Software, that is the software counter-part for the hardware Coprocessor Supervisor Module;

BIST Supervisor Software Module, that is the software counter part for the hardware BIST Supervisor Module;

Data Retry Software Module, that is the software counterpart for the hardware Data Retry Module;

Program Retry Software Module that is the software counterpart for hardware Program Retry Module.

For what concerns the peripherals of the Fault Recognition Accelerator 11, the Fault-Tolerant Memory interfaces 13 comprise:

a Fault Recognitor F-RAM Module, that wraps an external memory and code its contents in order to carry out an on-line Built-In Self Test and if needed on-line Built-In Self Repair;

a Fault Recognitor F-ROM Module that wraps an external memory and code its contents in order to carry out an on-line Built-In Self Test and if needed on-line 'Built-In Self Repair';

Fault Recognition F-DMA Module, that comprises a block that wraps the external memory DMA controller in order to check for address and data faults.

The Bus Interface Controller 14 comprises:

AHB Module that uses a redundant coded AHB bus in order to check data transmitted on the main AHB (Advanced High-performance Bus) bus like the bus system 53;

APB Module, that uses a redundant coded APB bus in order to check data transmitted on the main APB (Advanced Peripheral Bus) bus, like peripheral bus 63;

CAN Module that implements extra levels of fault-detection and correction for CAN bus modules.

As described above hardware verification component 15, are used for applying distributed fault tolerance techniques to the remaining interfaces and sensors of the microcontroller 10.

Hardware Verification Components 15 can be thought as the hardware realization of basic monitoring functions of the SpecMan Elite e-Verification Components (eVC), used in the design method that will be detailed with reference to FIGS. 6 and 7.

A hardware Verification Component 15 can be viewed as the inverse function of the module function to be monitored. FIG. 4 shows an example of the hardware Verification Component 15, associated to a generic peripheral PHY, that is interfaced both to the system bus 53 and directly connected to primary outputs.

The peripheral PHY generates three output signals: a clock C, and two outputs A and B. The main constraint on peripheral PHY is that output B must not change after three cycles from the change of A. The "e" language construct to check this condition is:

Expect@A_rise=>{[1.3];@B:rise} else PHY_error

In this way, independently from the correctness of the software or hardware that are currently driving the output ports of the peripheral PHY, an error can be generated in case of illegal situations. Errors are then collected and managed by Fault Recognition Accelerator 11.

These kind of "e" language constructs can be easily implemented in hardware in a hardware Verification Component 15 with a watchdog and a comparator. The other side of peripheral PHY is instead verified by the system verification procedure.

It is clear that the hardware Verification Component 15 complexity can easily grow up depending on the complexity of the signals to be verified. However it is also clear that the procedure exploiting hardware Verification Component 15 can increase system reliability by allowing runtime verification of illegal output configuration. Moreover, the hardware Verification Component 15 can be automatically generated starting from the eVC components used for system verification, by using a library of watchdogs, state machines, samplers, and so on. The integration of eVC and hardware Verification Component 15 into the same verification procedure can be a powerful tool for standardized design in a platform environment.

Hardware verification components 15 are supplied with a suitable hVC design kit, i.e., a software tool that translates the e-language verification constraints in Hardware verification components, by using:

a set of hVC base modules, that are detailed with reference to FIG. 5;

an hVC library of precompiled hardware verification components for standard blocks such PWM, timers and so on.

Figure 5:
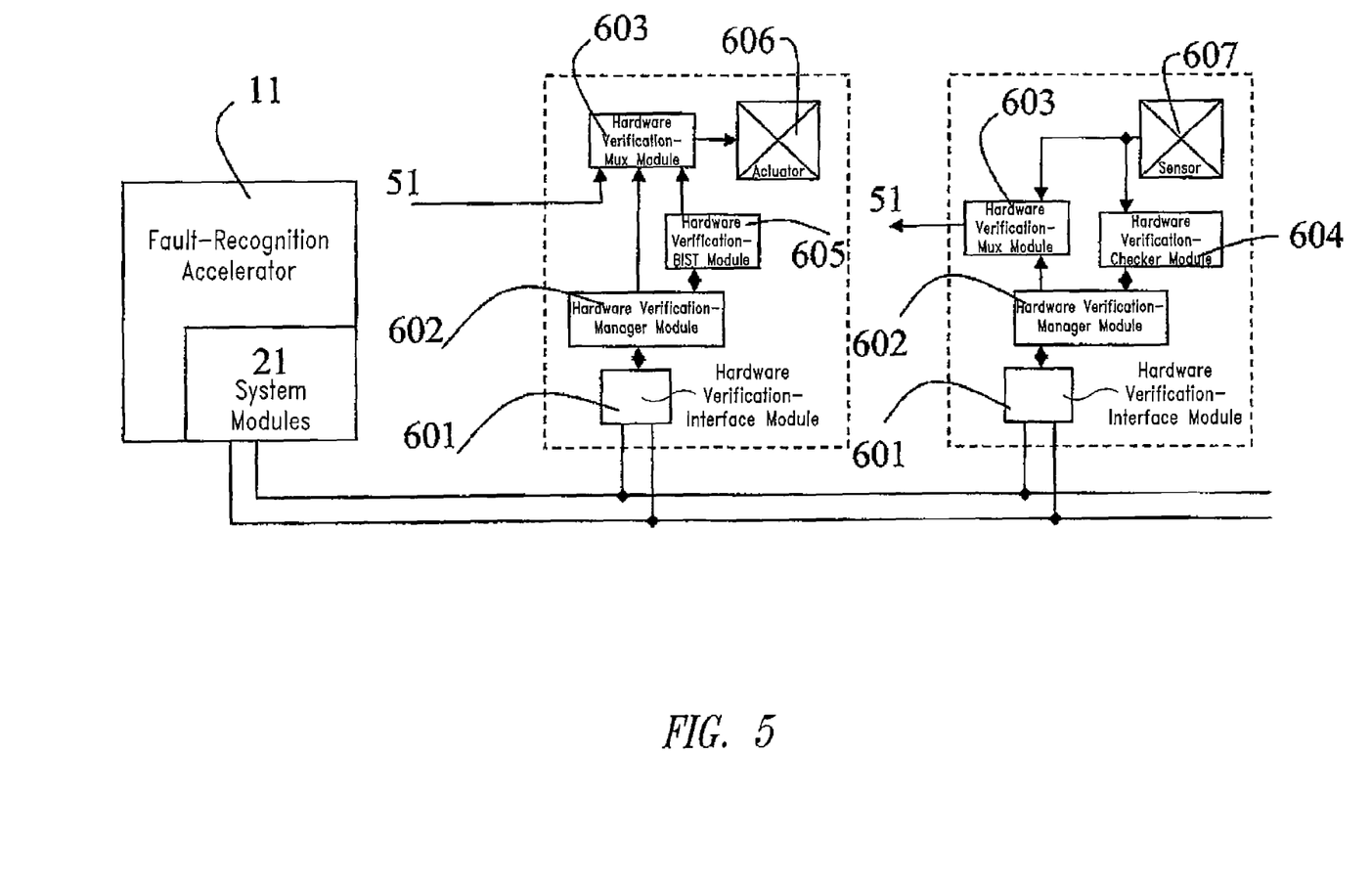
FIG. 5 shows a further detail of the hardware verification component shown in FIG. 4.

As shown in FIG. 5, the Fault Recognition Accelerator 11 communicates through the Fault Recognition Peripherals Manager Module belonging to modules 21 with the base hardware Verification Component 15 for monitoring an actuator 606 and hardware verification component 15' for monitoring a sensor 607.

The hardware verification component 15 comprises:

a Hardware Verification Checker Module 604, that embodies the hardware-verification checking unit of the Hardware verification block 15 for a given interface;

a Hardware Verification BIST Module 605, that embodies the hardware-verification BIST unit of the hardware Verification Component 15 for a given interface;

a Hardware Verification Interface Module 601, performing a safe connection between the Fault Recognition Accelerator 11 and the hardware Verification Components 15, receiving configurations values, providing Fault Recognition Accelerator 11 with go/no-go signals, receiving commands from Fault Recognition Accelerator 11, interacting with the Fault Recognition Peripherals Manager Module;

a Hardware Verification-Manager Module 602, that is the manager of the whole hardware Verification Component 15, and it is the responsible for putting the controlled interface in a safe state when needed;

Hardware Verification-MUX Module 603 that is a safe multiplexer structure used to select between system signal, for instance, central processing unit 51, and hardware Verification Components 15 signals;

a Hardware Verification-Configuration software Module that implements at compile time or design time all the needed features to configure the modules of hardware Verification Components 15, e.g., selecting/ordering legal-delta-context checking for the interfaces, etc. This module is part of the Initialization Software Modules previously described for the Fault Recognition Compiler 111.

As it can be seen from FIG. 5, hardware Verification Component 15' for the sensor 607 does not need the Hardware Verification BIST Module 605.

As mentioned above, the microcontroller 10 comprising the fault recognition accelerator 11 and its peripherals is designed by using a design procedure able to apply fault-avoidance and fault-removal techniques in order to achieve the desired system dependability. Such a design procedure comprises not only functional verification, but also fault-modeling, fault-injection and fault-forecasting at the design level that are integrated in the same design verification flow.

The proposed design procedure comprises a fault-injection method for testing the fault tolerance of the system with respect to a specified behavior, i.e., injecting faults in the design to validate and assess the fault-robustness of the designed system.

In association with the proposed fault-injection method a procedure called e-Fault, based on Verisity Specman Elite tool, is here described. Such a procedure is able to test for all the faults both at the device level (i.e., RTL or gate-level) and at the system level.

Summarizing, the design and verification procedure of an Embedded Computational Unit (ECU) based on the proposed microcontroller is mainly composed by:
  a set of eVC components for the platform components. Using these building blocks more complex eVC can be composed in order to verify system-level aspects;
  a CPU verification procedure. It is mainly composed by a constraint-driven test generator, that generates corner-case instruction sequences based both on user constraints and feedback from the coverage analyzer;
  a fault injector implemented using the capabilities of SpecMan Elite;
  a database of typical system situations, in particular automotive system situations, such as: multi-processor CAN/TTP units, fault models, and so on.

Figure 6:
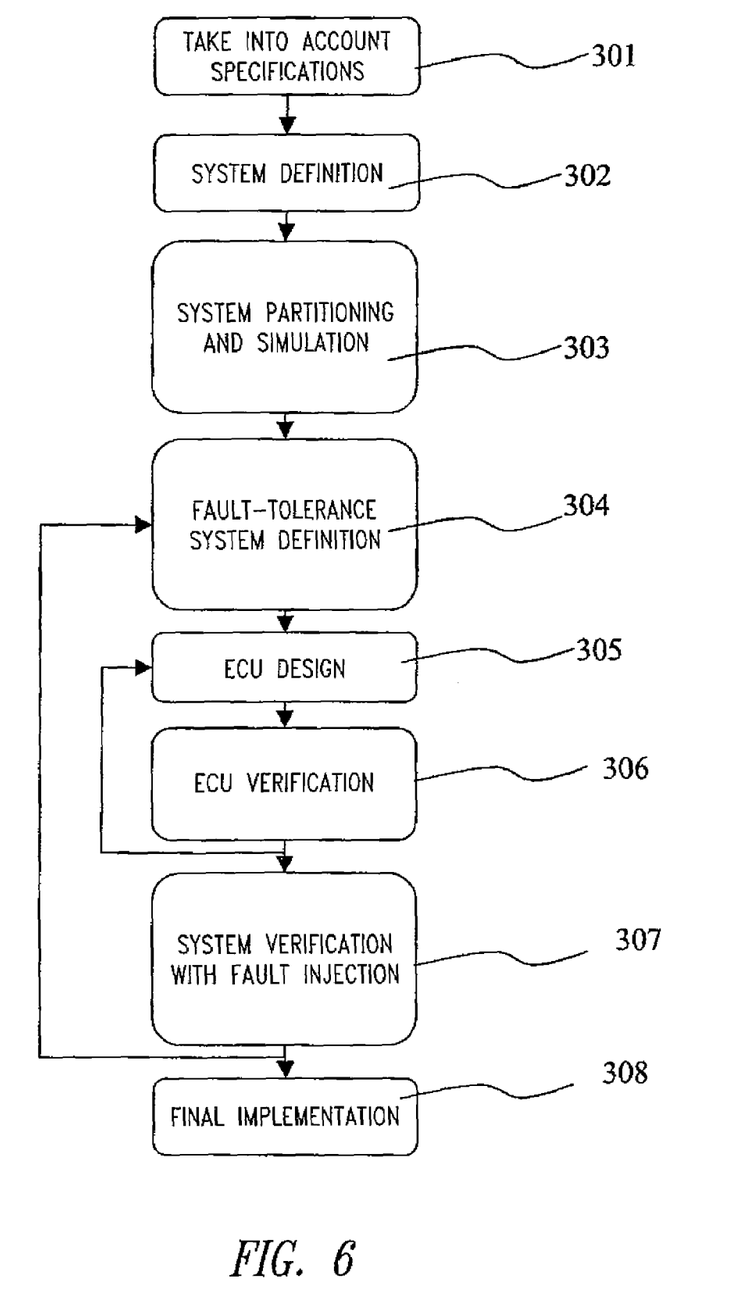
FIG. 6 shows a block diagram pertaining to a design procedure of the microcontroller of FIG. 1.

Such a design procedure can be easily integrated with a design-flow for automotive systems, resulting in a flow as depicted in FIG. 6, where:
  step 301 represents taking in account specifications;
  step 302 represents system definition;
  step 303 represents system partitioning and simulation;
  step 304 represents fault-tolerance system definition;
  step 305 represents ECU design;
  step 306 represents ECU verification;
  step 307 represents system verification with fault injection;
  step 308 represents final implementation.

System definition 302, system partitioning and simulation 303 at highest level are performed in SimuLink/Matlab environment, whereas ECU design 305, ECU verification 306 and system simulation/fault-injection 307 steps are performed in the proposed design and verification procedure. In particular the following steps are related to this invention:
  Fault Tolerance System Definition 304: this step can be performed both at RTOS (Real-Time Operating System) and system level starting in the SimuLink environment by using standard Hazard Analysis techniques, such as Software Failure Modes and Effects Analysis or others. Then, when basic needs are defined, such as for instance definition of fail-silent or fail-safe behaviors, these choices can be implemented at ECU design level within the design procedure, by defining for instance the level of Fault Recognition Accelerator 11 hardware/software integration for each of the system components, the dimension of the Fault Recognition Accelerator memory 12, and so on.
  ECU design 305 and verification 306: after system partitioning and fault-tolerance techniques definition, each block can be designed and verified, together with eVC and fault injection;
  System Verification with Fault-injection 307: the complete system can be verified against faults and the fault-tolerance choices can be validated at the system level.

It is worth noting that both the modularity of the design procedure and the possibility to verify fault-tolerant strategies together with the system specification, strongly reduce design time by dramatically reducing fault-avoidance and fault-removal time.

The procedure for implementing the fault-injection steps 306 and 307, will be now described. Such a procedure is based on the SpecMan Elite verification tool from Verisity Corporation, a verification technology that provides the above mentioned re-usable e-Verification Components eVC, written in a proprietary high level 'e' language. eVCs incorporate the test stimulus and expected results within them. An advantage of this verification technique is the portability and re-usability of eVCs.

Figure 7:
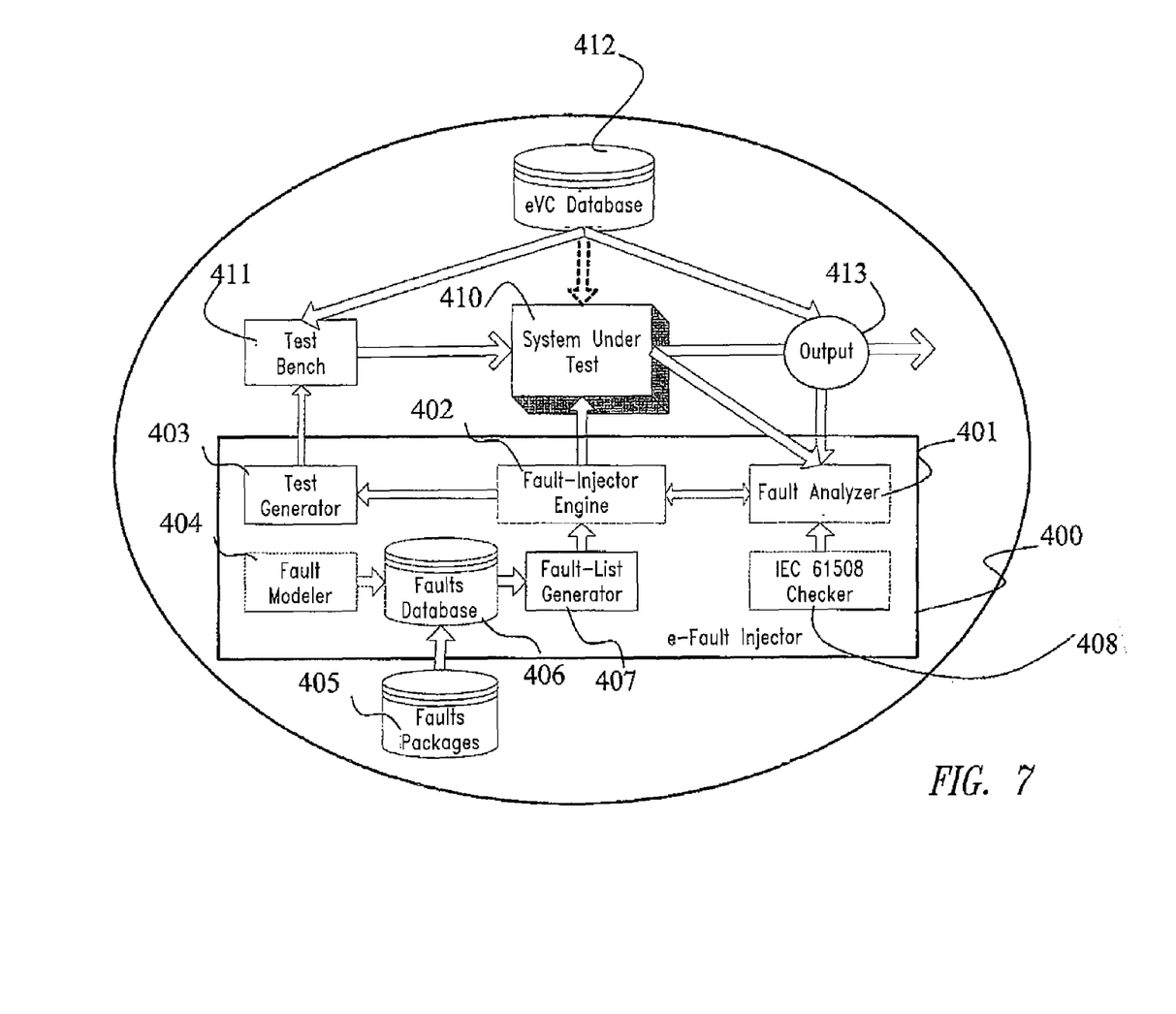
FIG. 7 shows a block diagram representing a fault injection procedure used in the design procedure of FIG. 6.

FIG. 7 schematically represents said verification tool, where a System under Test 410 is tested through a general test bench 411, that receives as input data from an eVC database 412, operating according the usual SpecMan Elite verification tools, and from an e-Fault injector 400. Such an e-Fault injector 400 comprises a Faults Database 406. Such a Faults Database 406 is extended either with additional Faults Packages 405 or customized by the user by means of a Fault-Modeler 40. The e-Fault injector 400 further includes a Fault-List Generator 407 able to select and compact the faults to be injected in the System under Test 410, a Fault-Injector Engine 402 with advanced fault injection algorithms, a Test Generator 403 to provide to the test bench 411 standard test patterns for fault sensitivity measurement, and a detailed Fault-Analyzer 401 in order to have statistics on fault effects. An IEC 61508 Checker 408 is implemented on a output 413 to verify compliance with IEC 61508 normative for safety critical design of electronic systems.

Faults Database 406 includes the following base fault models:
  basic "bit-level" models such stuck-at, open line, indetermination, short, bridging, glitches and bit-flips;
  basic memory fault models (SRAM, ROM, and so on);
  faults in the clock/power lines;
  extension of "bit-level" fault models at higher-level of abstraction (e.g., pure behavior), such variable faults, branches/cases conditions mutants, and so on.

In addition, special Faults Packages 405 are realized-with advanced radiation effect fault models (SEU package), typical fault models for bus protocols (BUS package, with CAN, OCP, AMBA faults), faults for standard digital (CPU package, with APB/AHB slaves), advanced memories configurations (MEM package, with Flash, D-RAM), ARM package with fault models for ARM processors (i.e., with models to insert faults in instructions through the modification of the correspondent micro-code), and so on.

The Fault Modeler 404 is also provided to add custom fault models. Models are fully configurable and main parameters are physical parameters for faults (shape, duration, amplitude, cardinality, etc.), frequency of faults, faults probability distribution.

Fault-List generator 407 is a pre-processor that is included to generate the fault list and collapse it based on static and dynamic collapsing algorithms, to reduce simulation time. User is also able to control parts of the system to be injected and add extra constraints for the fault list generation.

Test Generator 403 is able to generate the workload for device-oriented fault-injection or more in general to increase the fault coverage of a mission-oriented fault-injection covering the part of the device under test not covered by the mission workload.

Fault-injector Engine 402 is an engine written in e-language to realize the algorithm to inject faults in the system. User is able to control fault injection for instance by choosing random, pseudo-random, deterministic fault injection.

Results of fault simulation are analyzed by the Fault Analyzer 401 with basic comparison rules (such as device state at sample points, IO values, etc.) and user defined comparison rules. Fault Analyzer 401 includes a Collector Module to store information about the simulations that have been run.

This information is organized in a graphical way, e.g., about how many of the injected faults have been well tolerated, how many have produced errors, and each graphical representation is plotted for fault type, system block, and so on. Results are measured in sensitivity, FIT rates, propagation/detection/recovery latencies.

Finally, an IEC 61508 Checker 408 is included to allow the injection of standard faults defined by the IEC 61508 norm (such as faults for Bus, CPU, clocks, and so on) and the analysis of fault effects based on IEC 61508 safety integrity levels requirements).

The arrangements disclosed herein permit to obtain remarkable advantages over the known solutions.

The use of a mixed hardware and software approach to design fault-robust systems, implementing hardware redundancy controlled and configured by software, allows to achieve fault tolerance of complex CPU-based system on a chips without compromising execution time and code dimensions and with an acceptable hardware overhead.

The microcontroller according to the invention advantageously is based on a full-configurable asymmetric redundancy, reducing remarkably the area overhead compared with dual or multiple redundancies. Thanks to its limited area overhead, such a microcontroller can be built with gate-level fault-tolerance techniques (such triple-modular-redundancy flip-flops in state machines) in order to have the highest degree of robustness and negligible probability of unrecoverable internal failures.

It is intrinsically a distributed fault-tolerant approach, where fault-tolerant techniques and associated circuits are distributed in every part of the microcontroller, watching a particular problem and communicating with a central fault-tolerant processor that coordinates all the peripherals and keeps track of the fault-history of the system. Thanks to the strict interaction between the central fault-tolerant processor and the CPU, the system is also a low-latency fault-detection system, i.e., faults are caught very soon to avoid error propagation and to allow earlier safe system recovery. Finally, the system is customized and customizable: thanks to its strict hardware-software interaction, it gives many possibilities to the application and Operative System designers in order to configure the part of the application code or set of variables or peripherals to be protected, including as much as fault tolerance they need.

Without prejudice to the underlying principle of the invention, the details and embodiment may vary, also significantly, with respect to what has been discussed just by way of example without departing from the scope of the invention, ad defined by the claims that follow.

The primary field of application of the arrangement disclosed herein are microcontrollers or System on Chip for automotive applications, but it is clear that the scope of the invention extends to achievement of dependability in all systems comprising a microcontroller, comprising a central processing unit, a system bus and one or more functional parts comprising interfaces and peripherals, where a further fault processing unit suitable for performing validation of operations of said central processing unit is provided.

For instance, for what concerns safety applications, the present invention is applicable not only in safety-critical systems (such as automotive, aerospace and biomedics) but also in reliability or availability critical systems such high-speed communications or advanced multimedia systems.

In terms of faults respect to which the system should be robust, the present invention is not limited to a particular kind of faults. The invention is addressing either:

mechanical faults, i.e., due to deterioration (wear, fatigue, corrosion) or shock (fractures, striction, overload), as soon as they cause an electronic fault in the system;

Electronic faults, i.e., due to latent manufacturing defects (stuck-at in hidden part of the circuit), or to the operating environment (radiation, noise, heat, ESD, electro-migration), as soon as they are detected by the fault-detection mechanisms and, concerning design defects, as soon as they cause either an illegal execution-flow and/or an illegal operating code processing and/or an illegal values of critical variables, respect to the application code;

Software faults (including the ones in the Compiler), i.e., design defects or "code rot" (e.g., accumulated run-time faults), if they cause either an illegal execution-flow and/or an illegal operating code processing and/or an illegal values of critical variables, respect to the application code. Software faults are also detected if they cause illegal transitions in peripherals.

Moreover, the present invention can detect permanent faults but also both transient and intermittent ones. Concerning transient faults, it is worth noting that in modern DSM technologies transient faults (often called Soft Errors) can be very frequent. Soft Error Rate (SER) has traditionally concerned the nuclear and space communities but it is increasingly worrying semiconductor companies and designers of consumer and communication products.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fault-robust microcontroller, comprising:
a central processing unit including registers and an arithmetic logic unit;
a system bus and one or more functional parts comprising interfaces and peripherals;
a fault processing unit configured to perform validation of operations of said central processing unit; and
an interface between said central processing unit and said fault processing unit,
wherein:
said fault processing unit is external and different with respect to said central processing unit,
said fault processing unit comprises at least one module configured to detect, during operation of said central processing unit, faults causing differences between said central processing unit and said fault processing unit,
said fault processing unit configurable by a failure modes and effects analysis performed as part of a design and verification procedure of said microcontroller,
said fault processing unit differing from said central processing unit in that said fault processing unit includes one or more modules configured to perform data shadowing operations and arithmetic logic unit integrity checking operations applied to said central processing unit, wherein said one or more modules are reduced with respect to said registers and said arithmetic logic unit of said central processing unit by covering a reduced set of operations of an integer core of said central processing unit selected by said failure modes and effects analysis, said reduced set of operations included in an arithmetic logic unit module representing a reduced copy of said integer core, and by operating with coded data values from a coded copy of shadowed registers of said registers of said central processing unit, said coded data values having a lesser number of bits than said shadowed registers, said coded copy of shadowed registers obtained in a shadow register module, and said interface between said central processing unit and said fault processing unit being a dedicated bus connected only between said fault processing unit and said integer core of said central processing unit, said shadow register module and said arithmetic logic unit module being adapted to use said interface to access said integer core of said central processing unit at least by accessing an arithmetic logic unit write port of said central processing unit.

2. The microcontroller of claim 1 wherein said fault processing unit further comprises one or more modules configured for performing validation of operations of said other functional parts, said one or more modules comprise system modules suitable for interacting with fault recognition peripherals associated to said fault processing unit, for interacting with basic system components and for managing other internal modules of the fault processing unit.

3. The microcontroller of claim 2 wherein said system modules include a global supervisor module for managing other internal modules of said fault processing unit.

4. The microcontroller of claim 3 wherein said system modules include a Fault-Recognition Accelerator ("FRAC") to FRAC interface unit suitable for exchanging information with a second fault processing unit or with an external watchdog.

5. The microcontroller of claim 1 wherein said fault processing unit is performing validation of operations of said central processing unit by using one or more of the following fault protection techniques:
   code and flow signature check;
   data processing legality check;
   addressing legality check; or
   concurrent mode and/or interrupt check.

6. The microcontroller of claim 1 wherein said at least one module configured to detect faults comprises main protection modules configured to implement said fault protection techniques.

7. The microcontroller of claim 6 wherein the main protection modules comprise one or more of the following modules:
   Shadow Variable Module configured to make a copy of critical variables used by an application;
   Legal Variable Module configured to check legal values for a given variable;
   Code and Flow Signature Module configured to detect faults in central processing unit program flow based on code signatures;
   Safe State Module configured to bring the microcontroller to a safe-state;
   Legal Load/Store Unit Module configured to check legal values for a given address;
   Task Supervisor Module configured for multi-process applications to check legal memory accesses made by various tasks;
   Data Retry Module configured to implement fault-correction by restoring values in faulty variables and/or registers in the memories; or
   Program Retry Module configured to implement fault-correction by restoring central processing unit state and program counter.

8. The microcontroller of claim 1 wherein said at least one module configured to detect faults comprises central processing unit interface modules configured to exchange data with the central processing unit and the system bus.

9. The microcontroller of claim 8 wherein said at least one module configured to detect faults comprises central processing unit modules configured to process data arriving from Fault Recognition Accelerator/CPU interface modules and to exchange data with the main protection modules and in that said central processing unit modules comprise one or more among the following modules:
   EXC/INT Supervisor Module configured to concurrently check if the issued interrupts and exceptions are valid and served, considering the memory map configuration (access permissions, alignment and unaligned accesses etc.) and the interrupt requests;
   Mode/Flag Supervisor Module configured to concurrently check if flags and central processing unit mode signals are valid;
   ALU/MAC Supervisor Module configured to concurrently check the operation of the arithmetic logic unit;
   BIST Supervisor Module configured to start a built in self test of the central processing unit core or part of it; or
   Instruction Prediction Module configured to realize a sort of a cache storing recent part of codes executed by the central processing unit, comparing with the current program flow and detecting differences.

10. The microcontroller of claim 9 wherein said central processing unit and said fault processing unit configured to perform validation of operations are coupled with a secondary processing unit and a respective second fault processing unit configured to perform validation of operations of the secondary processing unit in order to realize a dual redundant system.

11. The microcontroller of claim 1 wherein said fault recognition peripherals comprises a memory module.

12. The microcontroller of claim 1 wherein said fault recognition peripherals comprise fault tolerant memory interfaces.

13. The microcontroller of claim 1 wherein said fault processing unit further comprises one or more modules configured to perform validation of operations of said other functional parts, and wherein hardware verification components are associated to said other functional parts of said microcontroller to perform validation of operations under control of said one or more modules.

14. The microcontroller of claim 13 wherein said hardware verification components are obtained as hardware translation of codes used for design verification.

15. The microcontroller of claim 14 wherein said hardware verification components comprise one or more among the following basic hardware verification modules that implement said hardware translation:
   a module configured to perform hardware-verification checking;
   a module configured to perform hardware-verification BIST;
   a module configured to perform hardware verification of interfaces;

a module configured to perform hardware verification management;

a multiplexer structure configured to select between system signal and hardware Verification Components signals; or a module configured to perform configuration of software.

16. The microcontroller of claim 15 wherein said basic hardware verification modules are configured through a Hardware Verification-Configuration software Module, comprised in initialization modules of a compiling procedure.

17. The microcontroller of claim 1 wherein said fault recognition peripherals further comprise a bus interface controller to monitor the system bus of said microcontroller.

18. The microcontroller of claim 1 wherein said fault recognition peripherals further comprise a simplified processor associated to application specific peripherals.

19. The microcontroller of claim 1 wherein said fault processing unit implements a compiling procedure to perform at least one of the following operations:

initialization of basic functions of the fault processing unit;

interaction with an operative system;

application configuration of the fault processing unit, with respect to the operative system and a user application code; or insertion of run time modules in the user application code to allow fault-detection and protection techniques.

20. The microcontroller of claim 19 wherein said insertion of run time modules in application code implements direct central processing unit registers and arithmetic logic unit visibility, tasks and exceptions supervising, and/or built in self tests ("BIST").

21. A method for detecting faults in the microcontroller of claim 1, the method comprising:

executing, during said microcontroller activity, on-line fault tolerance operations suitable for generating fault alarms and fault events if a fault is detected.

22. The method of claim 21 wherein said on-line fault tolerance operations implement one or more of the following fault protection techniques:

code and flow signature check;

data processing legality check;

addressing legality check; or concurrent mode/interrupt check.

23. The method of claim 21 wherein said fault processing unit executes during said microcontroller activity also the following operations in different times:

microcontroller fault-forecasting at power-on operations;

microcontroller on-line fault-forecasting operations.

24. The method of claim 23 wherein said microcontroller fault-forecasting at power-on operations comprise running a sequence of BIST tests run at power-on.

25. The method of claim 23 wherein said microcontroller on-line fault-forecasting operations comprise executing a subset of said sequence of BIST tests run during the system runtime.

26. A fault robust microcontroller, comprising:

a central processing unit including registers and an arithmetic logic unit; and a system bus and one or more functional parts comprising interfaces and peripherals, said microcontroller including means for achieving fault robustness of the microcontroller operations, said means comprising a fault processing unit suitable for performing validation of operations of said central processing, wherein said fault processing unit is external with respect to said central processing unit and different from a copy of said central processing unit, said fault processing unit includes a plurality of modules comprising at least one module implementing fault tolerant techniques to detect during normal operation of said central processing unit permanent, transient and intermittent faults causing differences between said central processing unit and said fault processing unit, said fault processing unit is configurable by a failure modes and effects analysis during a fault tolerance system definition procedure included in a design and verification procedure of said microcontroller, and said fault processing unit being different from a copy of said central processing unit at least in that includes one or more modules for data shadowing operations and arithmetic logic unit integrity checking operations applied to said central processing unit, and said one or more modules are reduced with respect to the registers and arithmetic logic unit of said central processing unit by covering a reduced set of operations of said arithmetic logic unit of said central processing unit, said reduced set of operations selected by the failure modes and effects analysis, and by making use of data coding of shadowed registers of said registers of said central processing unit, said data coding having a lesser number of bits than said shadowed registers.

27. The microcontroller of claim 26 wherein the arithmetic logic unit includes a multiply and accumulate unit.

28. The microcontroller of claim 26 wherein the data shadowing operations include variable shadowing and/or register shadowing.

29. The microcontroller of claim 26, wherein said validation of operations is based on visibility of said central processing unit provided by a hardware or software interface that communicatively couples said central processing unit to said fault processing unit.

30. The microcontroller of claim 26, wherein said fault processing unit provides microcontroller fault forecasting at power-on of said microcontroller, microcontroller on-line fault forecasting, and fault history tracking of fault-recognition peripherals.

* * * * *